United States Patent
Davis

(10) Patent No.: US 11,614,133 B2
(45) Date of Patent: Mar. 28, 2023

(54) WHEEL SHIELD

(71) Applicant: Joshua Davis, Glencoe, KY (US)

(72) Inventor: Joshua Davis, Glencoe, KY (US)

( * ) Notice: Subject to any disclaimer, the term of this patent is extended or adjusted under 35 U.S.C. 154(b) by 980 days.

(21) Appl. No.: 16/383,168

(22) Filed: Apr. 12, 2019

(65) Prior Publication Data

US 2019/0331177 A1 Oct. 31, 2019

Related U.S. Application Data

(60) Provisional application No. 62/663,026, filed on Apr. 26, 2018.

(51) Int. Cl.
*F16D 65/00* (2006.01)
*F16D 65/847* (2006.01)
*B60B 7/06* (2006.01)
*B60B 7/04* (2006.01)

(52) U.S. Cl.
CPC ............ *F16D 65/0031* (2013.01); *B60B 7/04* (2013.01); *B60B 7/068* (2013.01); *F16D 65/847* (2013.01); *B60B 2900/141* (2013.01); *B60B 2900/211* (2013.01)

(58) Field of Classification Search
CPC ..... B60B 7/04; B60B 7/068; B60B 2900/141; B60B 2900/211; F16D 65/847; F16D 65/0031
See application file for complete search history.

(56) References Cited

U.S. PATENT DOCUMENTS

| 4,484,667 | A | * | 11/1984 | Bottieri, Jr. | B60T 1/065 |
| | | | | | 188/218 A |
| 5,722,734 | A | * | 3/1998 | Bennick | B60B 7/04 |
| | | | | | 301/37.104 |
| 5,772,286 | A | * | 6/1998 | Jordan | F16D 65/0031 |
| | | | | | 301/37.104 |
| 6,047,796 | A | * | 4/2000 | Fitzgerald | B60B 7/00 |
| | | | | | 188/218 A |
| 6,371,569 | B1 | * | 4/2002 | Dean | B60B 7/14 |
| | | | | | 301/37.101 |
| 2005/0225160 | A1 | * | 10/2005 | Barnes | B60B 7/006 |
| | | | | | 301/37.101 |
| 2015/0091367 | A1 | * | 4/2015 | Young | B60B 7/066 |
| | | | | | 301/37.105 |

* cited by examiner

*Primary Examiner* — S. Joseph Morano
*Assistant Examiner* — Emily G. Castonguay
(74) *Attorney, Agent, or Firm* — Jenei LLC

(57) ABSTRACT

A wheel shield includes a central disk having a central wheel hub opening surrounded by annularly spaced stud holes that correspond to a pattern presented by a vehicle. The central disk includes an outwardly open fastening surface such as a channel positioned around an outer diameter of the central disk. The wheel shield includes a radially-compressible ring such as radially extending filaments. The radially-compressible ring has an inner diameter attached in the outwardly open fastening surface of the central disk and sized to engagingly contact an inner diameter of a vehicle wheel rim to restrict movement of brake dust to an exposed outer surface of the vehicle wheel rim while still allowing for the movement of air for cooling.

7 Claims, 1 Drawing Sheet

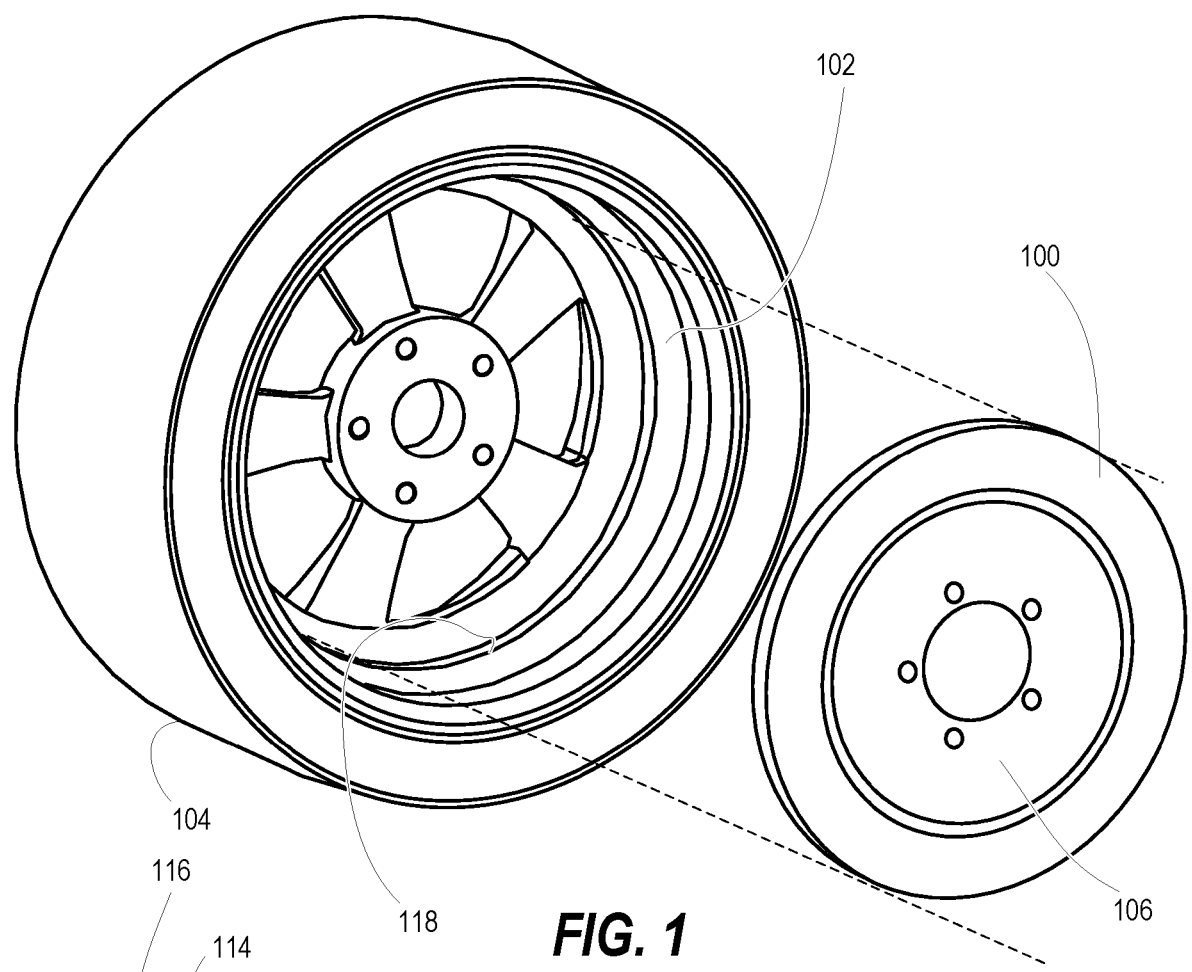
FIG. 1
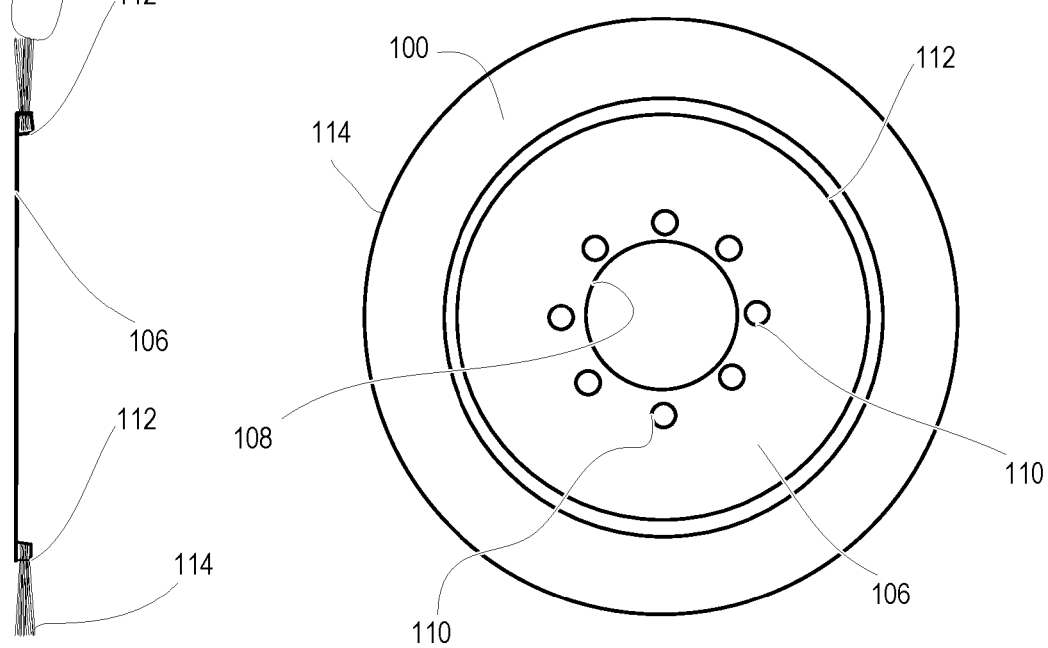
FIG. 3  FIG. 2

WHEEL SHIELD

CROSS-REFERENCE TO RELATED APPLICATIONS

The present Application for Patent claims priority to U.S. Provisional Application No. 62/663,026 entitled "WHEEL SHIELD" filed 26 Apr. 2018, which is hereby expressly incorporated by reference herein.

BACKGROUND

1. Technical Field

The present disclosure generally relates to a brake dust seal configured to protect a wheel with a rim from brake dust coming from brake pads near the wheel.

2. Description of the Related Art

Most passenger vehicles rely upon disk brakes having a wheel rotor that rotates with the corresponding wheel. Two stationary brake pads are positioned closely on the inside and outside of the rotor. In response to a braking command, a caliper asserts a closing force on the brake pads to grip the rotor, causing frictional slowing of the rotor and thus the wheel. The abrasive material of the brake pads wears off during use creating brake dust that tends to discolor the exposed portions of the wheel rim.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 illustrates an isometric exploded view of a vehicle wheel and a brake shield, according to one or more embodiments;

FIG. 2 illustrates a front view of the brake shield, according to one or more embodiments; and FIG. 3 illustrates a side view of the brake shield, according to one or more embodiments.

DETAILED DESCRIPTION

A wheel shield includes a central disk having a central wheel hub opening surrounded by annularly spaced stud holes that correspond to a pattern presented by a vehicle. The central disk includes an outwardly open fastening surface such as a channel positioned around an outer diameter of the central disk. The wheel shield includes a radially-compressible ring such as radially extending filaments. In one or more embodiments, the radially-compressible ring has an inner diameter attached in the outwardly open fastening surface of the central disk and sized to engagingly contact an inner diameter of a vehicle wheel rim to restrict movement of brake dust to an exposed outer surface of the vehicle wheel rim while still allowing for the movement of air for cooling.

The purpose of the wheel shield is to prevent corrosive particles that result from braking mechanisms of automobiles (commonly known as brake dust) from reaching and collecting on the outer visible portion of an automobile wheel. This is accomplished by placing the shield between the automobile wheel and the braking mechanism, so that the particles are contained to the inner, non-visible side of the wheel.

The brake dust shield can be made up of two main components. A circular solid panel and an outer ring-shaped brush made from a plurality of filaments. The solid panel and the brush filaments work in conjunction to create a shield between the automobile braking mechanism and the outer visible portion of the wheel. Though a solid panel has been used in similar applications, they pale in comparison to the versatility of the wheel shield's ability to conform to many different wheel sizes, profiles, and designs when the filaments are added to the perimeter of the solid panel. The flexibility of the filaments allows the shield to conform to nearly any wheel profile, size or design without compromising its intended function and eliminates the need to manufacture a custom panel specific to the wheel to be protected. In addition, the loose filaments allow for the movement of air for cooling of the disk brake components. Both main components of the invention can be made from a number of different materials.

By surrounding the solid panel with a ring-shaped brush, the bristles create a wall that substantially blocks a large portion of dust and particles while still being air permeable. With an air permeable wall, the vehicle's movement can create the air flow necessary to cool the inner brake components while also enabling the removal of much of the dust and debris that would otherwise accumulate during use.

The brush may also be made of any suitable material and configured with filaments that are of sufficient length and thickness that the ring-shaped brush remains flexible to help conform to the shape of the wheel and substantially air permeable. In one or more embodiments of the invention, the brush may be made of synthetic bristles, such as nylon, or natural bristles, such as hair.

In one or more embodiments of the invention, the brush bristles (filaments) extend toward the vehicle wheel rim and may be long enough to touch the vehicle wheel rim. The bristles create an air permeable wall suitable to allow air to flow through while blocking a substantial portion of dust and particles. In alternate embodiments of the invention, the bristles do not extend far enough to touch the vehicle wheel rim while connected to the wheel. The series of bristles of the ring-shaped brush create an air permeable wall capable of allowing air to flow through or around the series of bristles.

In one or more embodiments of the invention, the outer ring-shaped brush component is not permanently affixed to the circular solid panel and is easily replaced with replacement outer ring-shaped brush components when the brush begins to lose efficiency due to wear and tear or clogging with dust, dirt, grime or other contaminants.

Solid panel may be comprised of many different materials including but not limited to, metal, plastics, rubbers, carbon fiber, fiber glass, or any other suitable material.

The outer ring-shaped brush has a brush inner diameter and brush outer diameter while the vehicle wheel rim has a rim inner diameter and a rim outer diameter. In one or more embodiments, the brush outer diameter is approximately equal to the rim outer diameter. In one or more embodiments, the filaments of the outer ring-shaped brush are about one inches to 12 inches in length. In some embodiments, solid panel can be held in place by tightening lug nuts on the vehicle wheel rim.

Filament may be comprised of many different types of material as well. Including but not limited to: metal, plastic, rubber, fiber glass, carbon fiber, nylon, animal hair, silicone, etc. Filament material may be coupled to solid panel in a number of different ways. One of which being a circular channel or track fastened to perimeter of solid panel with filament fastened in channel. The wheel shield can be held in place with the same studs and lugs that hold the wheel in place.

The solid panel is adapted for receiving the hub of an automobile. In one or more embodiments, the wheel shield is placed on the vehicle hub just as the wheel would be, then followed by the wheel and secured when wheel lug nuts are tightened, pinching it between the wheel and the hub.

Some, or all of wheel shield may be painted or customized as to preferred aesthetic appeal.

In some instances, the solid panel maybe altered with openings or holes to allow air to pass through for cooling purposes. A suitable, replaceable filter material may be placed over said openings or holes to prevent brake dust from passing through.

In some instances, a heat resistant insulation type material may be used with filament, to prevent filament from being exposed to extreme heat generated by braking mechanism of automobile.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIGS. 1—3 illustrate a wheel shield 100. With particular reference to FIG. 1, wheel shield 100 prevents brake dust from reaching an exposed side of a wheel rim 102 mounted on a vehicle tire 104. Wheel shield has a metal disk 106 with a central hole 108 sized to receive a vehicle hub. Central hole 108 is surrounded by annularly spaced stud holes 110 that correspond to a back side of the wheel rim 102. FIG. 1 illustrates an example pattern of five (5) stud holes 110. FIG. 2 illustrates an example pattern of eight (8) stud holes 110. Other patterns of stud holes can be configured to mount to other wheel stud arrangements. Wheel shield 100 is sandwiched between wheel brakes (not shown) and the wheel rim 102 when mounted onto a vehicle (not shown). Wheel shield 100 is a unitary assembly that is quickly installed when mounting a tire 104 and wheel rim 102 on a vehicle.

With particular reference to FIG. 3, metal disk 106 can present an outwardly directed channel, track or other fastening surface 112 that receives a ring shaped radially compressible structure such as a ring-shaped brush 114 having radially extending filaments 116 that seals to an inner diameter 118 of the wheel rim 102 (FIG. 1).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A wheel shield comprising:

a central disk having a central wheel hub opening surrounded by annularly spaced stud holes that correspond to a pattern presented by a vehicle and comprising an outwardly open fastening surface positioned around an outer diameter of the central disk; and a radially-compressible ring having an inner diameter attached in the outwardly open fastening surface of the central disk and sized to restrict movement of brake dust from a vehicle brake proximate to a vehicle wheel rim to an exposed outer surface of the vehicle wheel rim;

wherein the radially-compressible ring comprises a brush having a series of bristles extending from the central disk and is made up of radially extending filaments and configured to contain dust and debris.

2. The wheel shield of claim 1, wherein the outwardly open fastening surface comprises a channel.

3. The wheel shield of claim 1, wherein the series of bristles are flexible and of a length, diameter and spacing suitable to engagingly contact an inner diameter of a vehicle wheel rim and is suitable to restrict movement of brake dust to an exposed outer surface of the vehicle wheel rim while allowing air movement.

4. The wheel shield of claim 1, wherein the series of bristles are flexible and of a length, diameter and spacing that does not contact the inner diameter of a vehicle wheel rim but is suitable to restrict movement of brake dust to an exposed outer surface of the vehicle wheel rim while allowing air movement.

5. The wheel shield of claim 1, wherein the radially-compressible ring attaches to a perimeter of the central disk and may freely detach from the central disk.

6. The wheel shield of claim 1, wherein the series of bristles are replaceable.

7. The wheel shield of claim 1, wherein the series of bristles create an air permeable wall capable of allowing air to flow through or around the series of bristles to allow cooling of adjacent brake components.

* * * * *